Oct. 23, 1951  H. J. VAN DOORNE  2,572,410
STEERING MECHANISM FOR SEMITRAILER
SUPPORTING MECHANISMS
Filed May 24, 1948  2 SHEETS—SHEET 1

Inventor:
HUBERTUS JOSEPHUS VAN DOORNE
By: Hugh Kirk
His Attorney

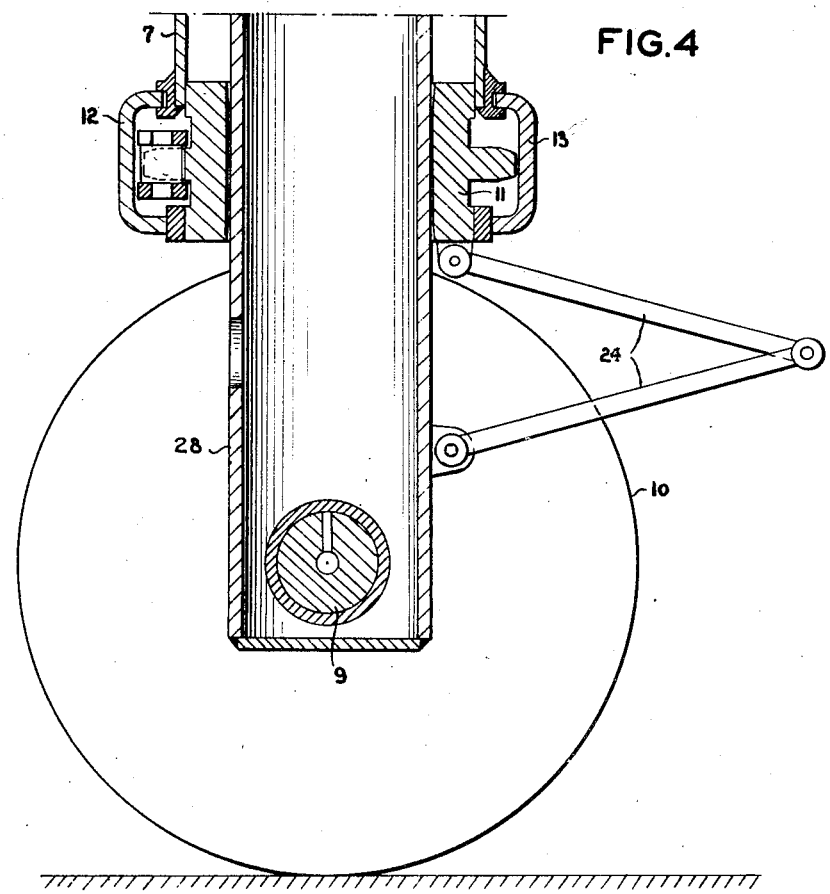

Patented Oct. 23, 1951

2,572,410

UNITED STATES PATENT OFFICE 2,572,410

STEERING MECHANISM FOR SEMITRAILER SUPPORTING MECHANISM

Hubertus Josephus van Doorne,
Deurne, Netherlands

Application May 24, 1948, Serial No. 28,948
In the Netherlands May 28, 1947

5 Claims. (Cl. 280—33.55)

This invention relates to a steering mechanism for vehicles. More particularly it deals with a steering mechanism for wheels on supporting legs for vehicles, such as for example the front retractable wheel supports for semi-trailers.

It is an object of this invention to provide a new, simple, efficient and effective steering mechanism for increasing the maneuverability of an uncoupled semi-trailer.

Another object is to provide a steering mechanism for steering in unison two or more vertical steering legs of a vehicle.

In accordance with this invention, the one or more legs of the support for the vehicle, each of which legs is provided with a ground engaging wheel, are provided with means for turning that portion of those legs which support said wheels in unison about their respective vertical axes. This may be accomplished by providing a slidable rack which engages toothed wheels or gears connected to each of said parallel legs, and to a gear connected to a steering and/or pulling bar for moving the vehicle.

The above mentioned and other features and objects of this invention and the manner of attaining them will become more apparent and the invention itself will be best understood by reference to the following description of an embodiment of the invention taken in conjunction with the accompanying drawings, wherein:

Fig. 4 is a vertical section of the lower end of a steering leg of a modified form of this invention.

Figure 1:
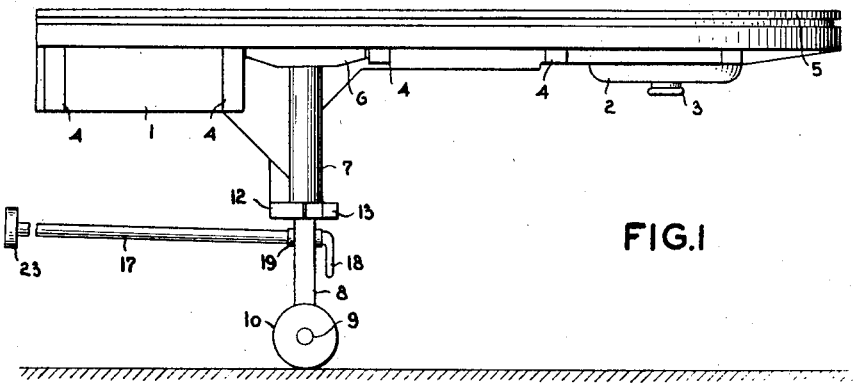
Fig. 1 is a side elevation of the front part of a semi-trailer disclosing one embodiment of this invention.
Figure 2:
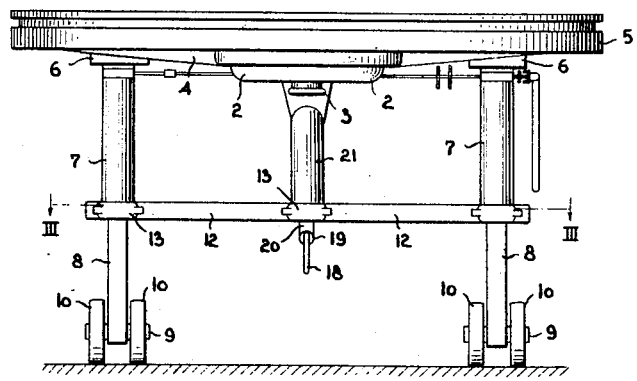
Fig. 2 is a front view of the trailer shown in Fig. 1.

Referring to Fig. 1, the main frame of the semi-trailer comprises a central hollow beam 1 which is flared and flattened as it extends toward the front end to form a mounting for the bearing plate or fifth wheel 2 on which the semi-trailer rests when it is connected to a tractor (not shown). In the center of plate 2 there extends downwardly a coupling sleeve 3 which is engaged by the coupling pin (not shown) of the tractor. The floor of the trailer is supported by cross-beams 4 and surrounded by rim 5. In the embodiment shown between two adjacent beams 4, there are mounted two liquid reservoirs or tanks 6, one on each side of the trailer, from each of which a vertical hydraulic cylinder 7 depends and into which cylinders telescoping pistons or legs 8 (which also act as steering shafts) may be retracted when the semi-trailer is connected to the tractor. However, when the trailer is detached, as shown in Figs. 1 and 2, the legs 8 are extended so that the wheels 10 mounted on axles 9 at the lower end of the legs 8 will rest on the ground and support the trailer against the incompressible liquid in cylinders 7 supplied from tanks 6.

Figure 3:
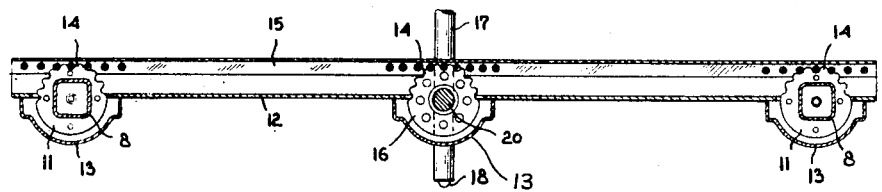
Fig. 3 is a section of the steering mechanism taken along line III—III in Fig. 2.

In the embodiment shown in Fig. 3, the telescoping legs 8 are provided with square cross-sectioned areas which slide through similar square holes in the partially toothed wheels or gears 11 which engage a slidable toothed rack 15 mounted in horizontal housing 12 provided with housing extensions 13 to enclose the gears 11. The housing 12 is fixedly mounted at the lower extremity of cylinders 7 and to a central cylinder 21 of similar structure to cylinders 7 having a similar housing 13 for a semi-toothed wheel or gear 16 with teeth 14 also in mesh with teeth on the rack 15. The central gear 16, however is fixed to a downwardly extending shaft 20 at the lower end of which is provided a horizontal sleeve 19 through which a steering bar 17 may slide having a handle 18 at one end and a collar 23 at the other end (see Fig. 1). When steering bar 17 is pulled to the right or forwardly from the position shown in Fig. 1, so that the collar 23 rests against the sleeve 19, the handle 18 extends at least to the front edge of the trailer so that a person may maneuver the trailer by pulling on the handle 18 and also turn both of the supporting legs in unison by pushing the handle from one side to the other, as desired. By this steering mechanism the two individual supporting legs act as steering shafts together with the shaft 20 and are all turned in unison in the same direction and to the same degree by a single movement of the pulling and steering bar 17. This is accomplished by turning the gear 17 which longitudinally slides the rack 15 and simultaneously turns both toothed wheels 11 and their corresponding legs 8 supporting wheels 10, equally and to the same angle as the wheel 16. When the bar 17 is not being used, a support (not shown) may be provided for fastening it under the semi-trailer in the position shown in Fig. 1.

Referring to the modification shown in Fig. 4 a link connection 24 is provided between each gear or toothed wheel 11 and the wheel 10 supporting end of the extending leg 8 so as to turn the leg around its vertical axis as the gear is turned regardless of the extended position of said leg, because the cross-sectional area of the leg 28 is round and not otherwise keyed to the toothed wheel 11.

The assembly comprising cylinders 7 and 21 and housings 12 and 13 is adapted for use on trailers having either two parallel supporting legs 8 as shown herein or a single center supporting leg retractable into cylinder 21.

Although the present invention has been shown adapted to hydraulically movable legs 8, the steering mechanism disclosed may also be adapted to mechanically movable legs without departing from the scope of this invention.

While there is described above the principles of this invention in connection with specific apparatus, it is to be clearly understood that this description is made only by way of example and not as a limitation to the scope of this invention.

What is claimed is:

1. A steering device for a semi-trailer having a plurality of vertical shafts, ground wheels mounted on the lower ends of a plurality of said shafts, means to axially extend and retract those shafts carrying said ground wheels, toothed wheels mounted on each of said shafts and each located in a fixed horizontal plane, horizontally movable means to engage all of said toothed wheels to turn all of said toothed wheels in unison, means to insure the rotation of each shaft with the rotation of its corresponding toothed wheel whereby the rotation of one of said shafts turns each of the other shafts simultaneously the same amount and in the same direction, and external means connected with one of said shafts to turn said one of said shafts.

2. The device of claim 1 wherein said shafts are located all in a common vertical plane and said horizontally movable means to engage all of said toothed wheels comprises a slidable rack bar parallel to said vertical plane.

3. The device of claim 1 wherein said means to insure rotation of each shaft with its corresponding toothed wheel comprises shafts having a keyed configuration in cross-section, which shafts may slide through the centers of said toothed wheels having correspondingly similarly configured cross-sectional openings for said shafts to slide through.

4. The device of claim 1 wherein said means to insure rotation of each shaft with its corresponding toothed wheel comprises link means connecting said toothed wheels with the said shafts to allow axial movement of said shafts with respect to the fixed position of said toothed wheels.

5. The device of claim 1 wherein said external means comprises a draw bar.

HUBERTUS JOSEPHUS v. DOORNE.

REFERENCES CITED

The following references are of record in the file of this patent:

UNITED STATES PATENTS

| Number | Name | Date |
|---|---|---|
| 949,202 | Shedenhelm | Feb. 15, 1910 |
| 2,055,747 | Laube et al. | Sept. 29, 1936 |
| 2,228,247 | Cunningham | Jan. 14, 1941 |

FOREIGN PATENTS

| Number | Country | Date |
|---|---|---|
| 102,188 | Australia | Oct. 21, 1937 |
| 394,683 | Germany | May 1, 1924 |